S. R. GILMORE.
CLAMP.
APPLICATION FILED MAY 23, 1921.
1,411,013.
Patented Mar. 28, 1922.
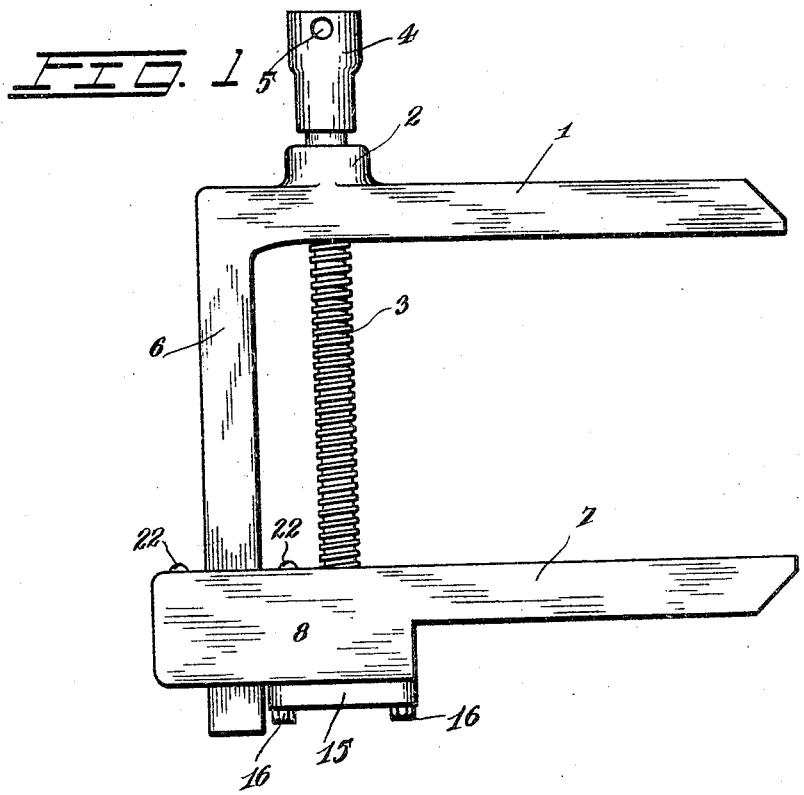
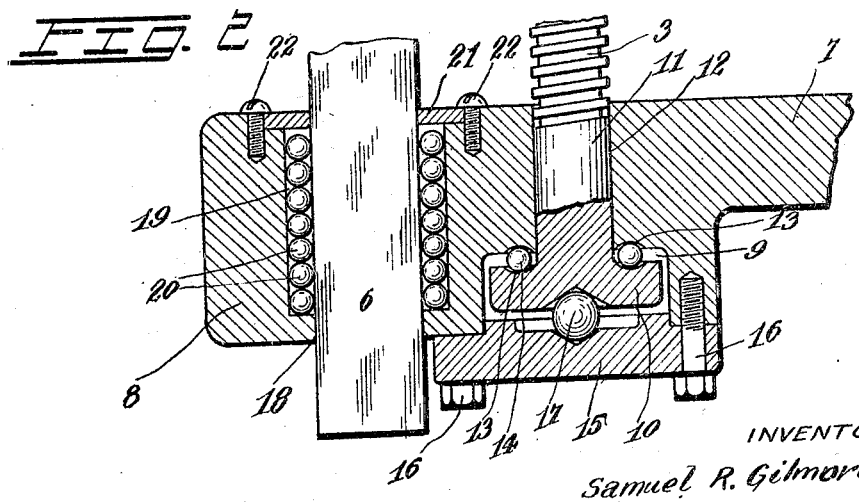
INVENTOR:
Samuel R. Gilmore
Mason, Fenwick & Lawrence
ATTORNEYS.

UNITED STATES PATENT OFFICE.

SAMUEL R. GILMORE, OF SEATTLE, WASHINGTON.

CLAMP.

1,411,013.   Specification of Letters Patent.   Patented Mar. 28, 1922.

Application filed May 23, 1921.   Serial No. 471,727.

*To all whom it may concern:*

Be it known that I, SAMUEL R. GILMORE, a citizen of the United States, residing at Seattle, in the county of King and State of Washington, have invented certain new and useful Improvements in Clamps; and I do hereby declare the following to be a full, clear, and exact description of the invention, such as will enable others skilled in the art to which it appertains to make and use the same.

This invention relates to new and useful improvements in clamps, and more particularly to that form of clamp having two opposed jaws provided with operating means to move the jaws toward and away from each other, the main object of the present invention being the provision of a simple and easily operated clamp provided with jaws of such construction that they may be readily used for clamping an object between the jaws or inserting the jaws between two objects to be separated and is so simple in its construction that it can be easily carried from place to place and furnish greater binding power than is ordinarily obtained from any portable clamp in use.

Another object of the present invention is the provision of a clamping member comprising two opposed jaws having operable means for moving the jaws toward and away from each other and provided with frictional bearings at the points where the greatest strain is produced in order to eliminate the friction at these points.

With the above and other objects in view the invention consists in the novel features of construction, combination and arrangement of parts hereinafter more fully set forth, pointed out in the claim and shown in the accompanying drawings in which:

Figure 1 is a side elevation of a clamp constructed in accordance with my invention;

Fig. 2 is a detail longitudinal sectional view through one of the clamping members, parts being illustrated in elevation.

In carrying out my invention, I provide a movable clamping jaw generally indicated by the numeral 1 and provided upon its outer face with a boss 2. Extending through the boss 2 and the body 1 is a threaded opening adapted to receive a screw member 3, said screw member having a head portion 4 at its outer end and provided with a transverse opening 5.

The body 1 of the movable clamping jaw is provided at one end with an angular extension arm 6 preferably extending from the jaw 1 at a point adjacent the boss 2 as clearly illustrated in Fig. 1. The main clamping jaw 7 which is arranged in opposed relation with the movable jaw 1 is provided at its inner end with a head portion 8 having a recess 9 formed in one face thereof to receive the head 10 of the screw 3. The end of the screw 3 adjacent the head 10 is provided with a smooth surface as indicated at 11, the smooth portion being disposed within a transverse opening 12 formed in the head 8 and communicating with the recess 9.

In order to prevent friction between the inner wall of the recess 9 and the head 10 of the screw, opposed raceways 13 are formed in the wall of the recess and the head 10 adapted to receive the bearing balls 14 which are circumferentially arranged around the head member 2 and disposed between the head member and the inner wall of the recess 9.

The recess 9 is closed by means of a cover plate 15 secured in position by means of the bolt 16. The head 10 of the screw and the inner face of the plate 15 are each provided with a raceway arranged in opposed relation for the reception of a bearing 17 which is adapted to eliminate friction between the inner face of the plate 15 and the outer face of the head 10 when the screw 3 is turned.

The head 8 is provided with a transverse opening 18 at right angles to the head 8 and disposed parallel with the opening 12 for the reception of the inner end of the arm 6 whereby the arm 6 may readily move through the head portion 8 when the jaw 1 is moved toward the jaw 7. A chamber 19 is formed within the head 8 in alignment with the opening 18 and arranged within this chamber are the bearing balls 20 adapted to be disposed between the arm 6 and the wall of the chamber to reduce the friction, said balls being retained within the chambers by means of the cover plate 21 secured in position by the screw bolts 22.

Any suitable power may be used and applied to the head portion 4 for rotating the screw member 3, said screw being rotated in the desired direction to move the jaw 1 toward or away from the jaw 7 when clamping an object between the two jaws or separating objects between which the jaws may be arranged. It will be noted that after the jaws engage an object to be clamped therebetween, further rotation of the screw 3 will tend to exert pressure upon the ball bearings 20 and 14 which will eliminate the friction between the head member 10 and the inner wall of the recess 9 and between the arm 6 and the walls of the chambers 19. When the two jaws are placed between objects to be separated, the strain of the screw member 3 will be brought against the bearing ball 17, which will eliminate friction between the head 10 and the inner face of the plate 15. In the construction of my improved clamp, the jaws 1 and 7 and arm 6 may be constructed of any suitable material in accordance with the use to which the clamp is to be put.

I claim:

A device of the class described including a jaw having a head portion at one end provided with spaced transverse openings, said head portion being also provided with a recess communicating with one of said openings, a screw member extending through one of said openings and having its head portion arranged within the recess, a removable plate attached to the head and closing the recess, bearing balls arranged between the head of the screw, the inner wall of the recess and the plate, a second jaw, a guide arm on the second jaw extending through one of the openings in the head of said first mentioned jaw and said second jaw being provided with a threaded opening to receive the screw member whereby the jaws can be moved toward and away from each other.

In testimony whereof I affix my signature.

SAMUEL R. GILMORE.